United States Patent [19]
Humphries et al.

[11] Patent Number: 4,799,631
[45] Date of Patent: Jan. 24, 1989

[54] AIRCRAFT SHELL MODULE

[75] Inventors: David R. Humphries, Clearwater; Donald C. Fetterhoff, St. Petersburg; William R. Higgins, Clearwater, all of Fla.

[73] Assignee: ATR International, Inc., Clearwater, Fla.

[21] Appl. No.: 15,839

[22] Filed: Feb. 18, 1987

[51] Int. Cl.$^4$ .............................................. B64C 1/14
[52] U.S. Cl. .................................... 244/118.5; 52/397; 52/144; 181/207; 105/397; 105/337; 105/338; 244/119
[58] Field of Search ............. 244/118.1, 118.5, 117 R, 244/119; 105/337, 330, 329.1, 397, 401; 52/397, 400, 243, 241, 144, 275, 245; 181/284, 207

[56] References Cited
U.S. PATENT DOCUMENTS

| | | | |
|---|---|---|---|
| 2,111,326 | 3/1938 | Norris | 244/119 |
| 2,912,724 | 11/1959 | Wilkes | 181/207 |
| 2,925,050 | 2/1960 | Candlin, Jr. et al. | 244/119 |
| 3,352,078 | 11/1967 | Neal | 52/397 |
| 4,050,208 | 9/1977 | Pompei et al. | 244/119 |
| 4,296,692 | 10/1981 | Roux | 105/397 |
| 4,319,528 | 3/1982 | Gutridge et al. | 105/397 |
| 4,674,712 | 6/1987 | Whitener et al. | 244/119 |

Primary Examiner—Galen Barefoot
Attorney, Agent, or Firm—Herbert W. Larson

[57] ABSTRACT

Two arcuate panel sections having a dampening layer between two honeycomb layers form a module which is mounted in multiple elastomeric isolators located within channel members. Support brackets attached to the interior of the aircraft skin support the channels in the overhead area and along the port and starboard deck edge. The module is thereby spaced apart from the aircraft frame. There is a resulting diminution of acoustic transmission from the aircraft frame to its interior passenger area.

16 Claims, 4 Drawing Sheets

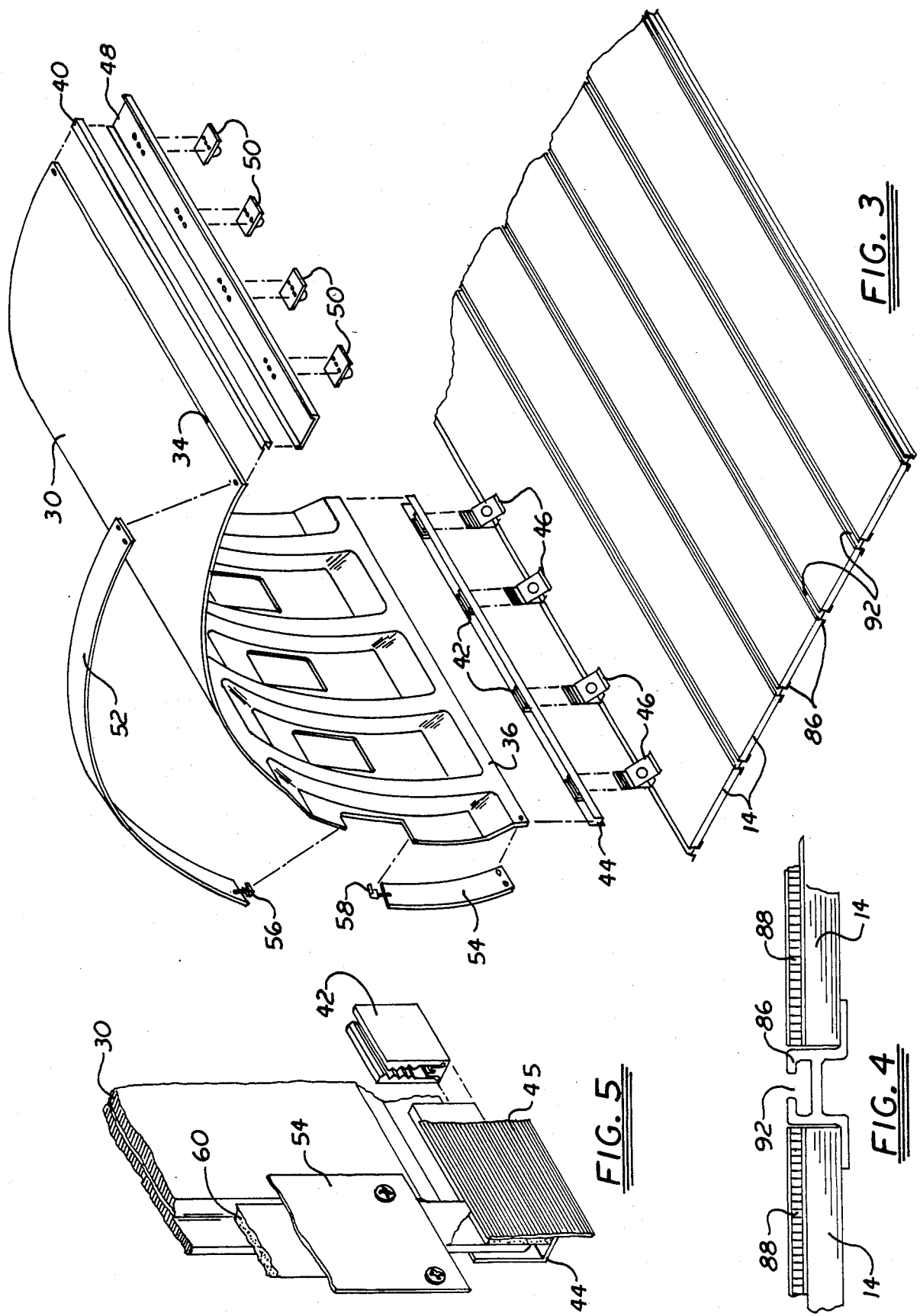

AIRCRAFT SHELL MODULE

BACKGROUND OF THE INVENTION

1. Field of the Invention.

This invention relates to aircraft interior modules. More particularly, it refers to an aircraft interior made of molded honeycomb panels with a layer of damping material bonded within the panels and the panel mounted so as to avoid direct contact with the interior of the aircraft skin.

2. Description of the Prior Art.

Interior insulation systems for airplanes have been well known for a long period of time. Improvements on these systems such as shown in U.S. Pat. No. 3,740,905 have not emphasized sound absorbing properties. However, sound absorption is becoming more and more important because of advanced power systems for new aircraft.

The level of low frequency sound impinging on the fuselage of future propfan powered airplanes is predicted to be higher than the level of low frequency jet exhaust noise that impinged on the aft fuselage of turbojet powered 707 and DC8 airplanes. The level of structure borne noise from propfan power propagating as vibration through the structure of a fuselage may well exceed that experienced on existing turbofan powered airplanes such as 727's and DC9's with aft mounted engines.

In 1986, passengers in newly delivered medium to long range transport airplanes (and the airlines that operate those airplanes) were accustomed to the level of acoustical comfort typified by the noise levels in 737, 300 and MD 80 airplanes where the levels of engine noise and boundary layer noise were well below the level of noise from advanced propfan propulsion systems.

A major task of the manufacturers is to find a means to introduce the fuel efficiency of advanced propfan engines without degrading the level of acoustical comfort provided for the passengers and crew by current technology transports.

Many business jet airplanes have special requirements for low interior noise levels during cruise. The interiors of most business jet airplanes are not installed by the airplane manufacturer because of the great variety of custom designs which are offered for individual operators. Airplanes are delivered in a "green" condition to "completion centers" for installation of the interior. To achieve the desired low interior noise levels, the installer of the interior utilizes special techniques and various combinations of damping material, vibration absorbers, vibration isolators, massive septa, and sound absorbing material.

A conventional approach to achieve low cabin noise levels has been to install fiberglass blankets between the fuselage frames for high frequency noise reduction. Noise reduction at low frequencies is provided by a massive septum made from a sheet of loaded vinyl (lead vinyl) outboard of the interior trim panel.

Double wall concepts have been evaluated theoretically and experimentally for transport category airplanes and versions of the concept are incorporated in all passenger carrying aircraft. The skin of the airplane forms one of the two walls; the interior sidewall trim panels and the ceiling panels form the other wall. A unified approach to a double wall has not been developed for transport category airplanes.

SUMMARY OF THE INVENTION

We have invented a module for aircraft that is self supporting and can contain all necessary interior aircraft auxilliary equipment as well as acoustical panel components to substantially reduce engine noise to persons within the aircraft. Our module is capable of being built in a factory and then installed in sections within the "green" condition aircraft.

The module has two side panels which are each arcuate in shape and elongated deck panels. Each panel contains a layer of damping material between layers of a honeycomb material with a structural face forming the exterior of the panel. The first or upper end of each module side panel is mounted in multiple elastomeric isolators located in an overhead channel. The channel is held in place by an overhead mounting plate which in turn is held in place by multiple support brackets attached to the overhead of the fuselage interior.

The second or lower end of each module panel is mounted in multiple elastomeric isolators mounted in respective port or starboard channels. These channels are attached to multiple support brackets which are in turn attached to the respective port or starboard side of a fuselage deck or floor beam. The fuselage deck is covered with rectangular panels.

The entire module is spaced apart from the interior fuselage of the aircraft. Consequently, the panels are held rigidly but have no direct contact with structural noise transmitting elements of the aircraft.

BRIEF DESCRIPTION OF THE DRAWINGS

The present invention may be best understood by those of ordinary skill in the art by reference to the following detailed description when considered in conjunction with the accompanying drawings in which:

FIG. 3 is an exploded view of one section of the module.

FIG. 4 is a cross-section view of the acoustical sandwich in the aircraft deck.

FIG. 5 is a broken section view of a panel mounted in an isolator.

DETAILED DESCRIPTION OF THE INVENTION

Figure 1:
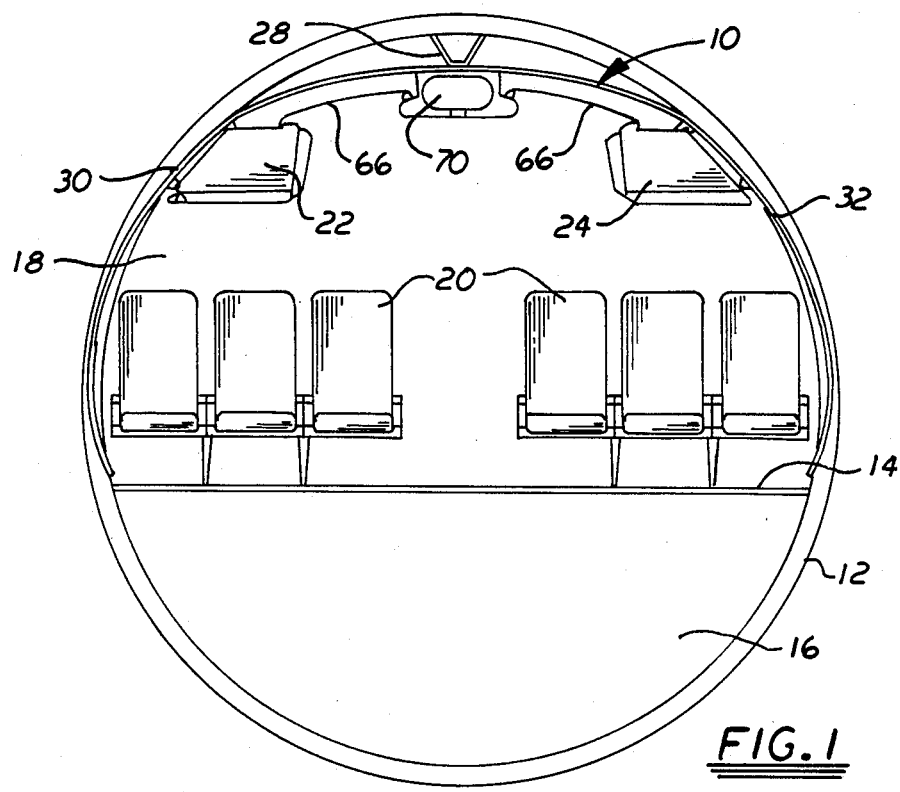
FIG. 1, is a cross-section view of an aircraft fuselage in which the one aisle module of this invention has been installed.

Throughout the following detailed description similar reference numerals refer to similar elements in all figures of the drawings.

Figure 2:
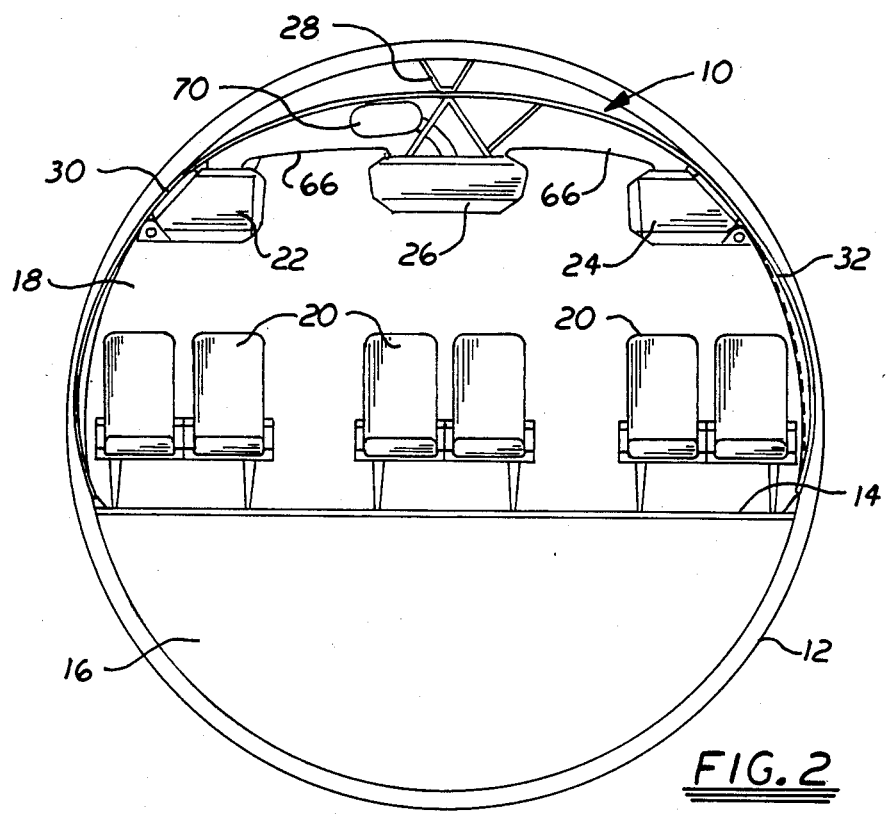
FIG. 2 is a cross-section view of an aircraft fuselage in which the two aisle module of this invention has been installed.
Figure 6:
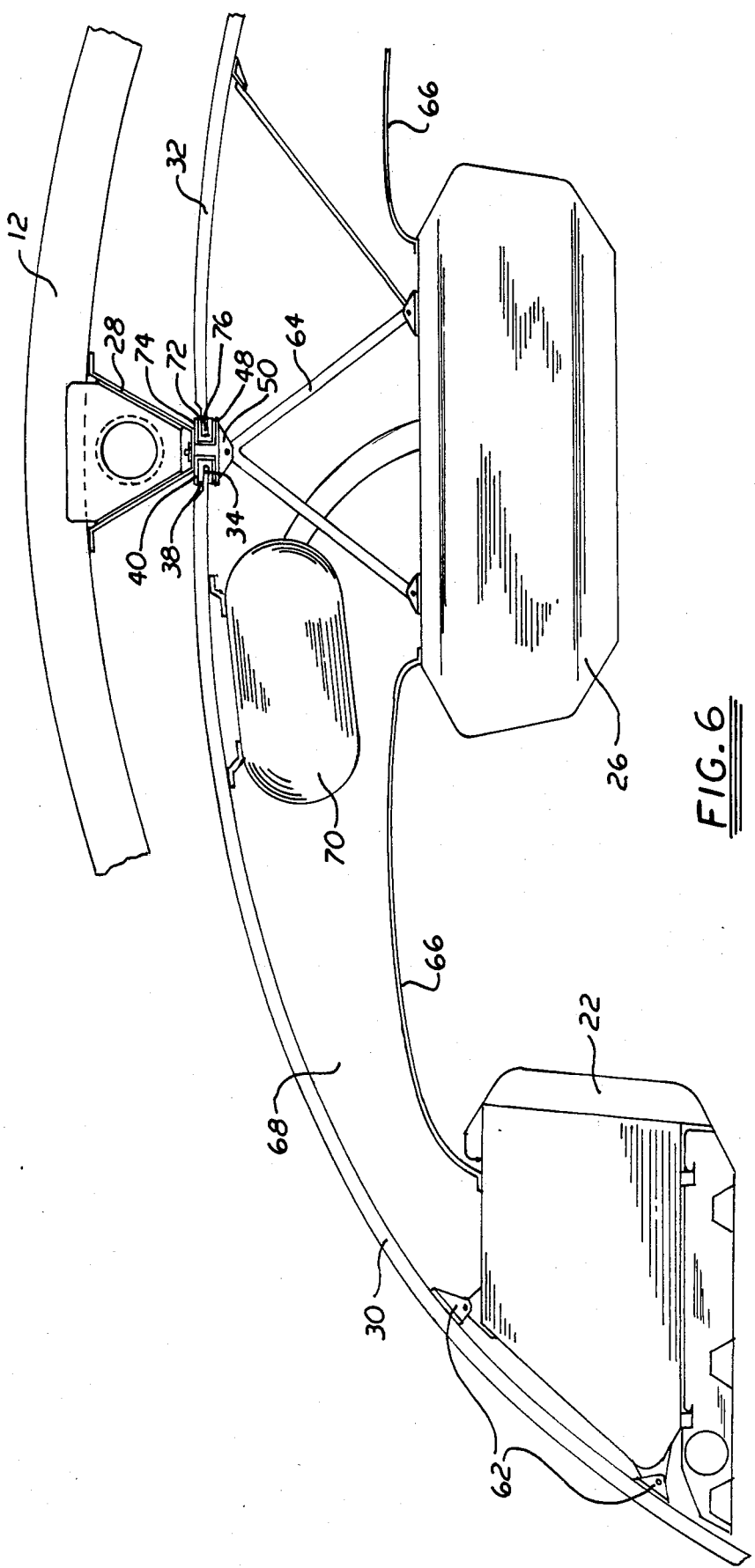
FIG. 6 is a front view of a first end of each panel joined together ad some suspended interior accessory equipment.
Figure 7:
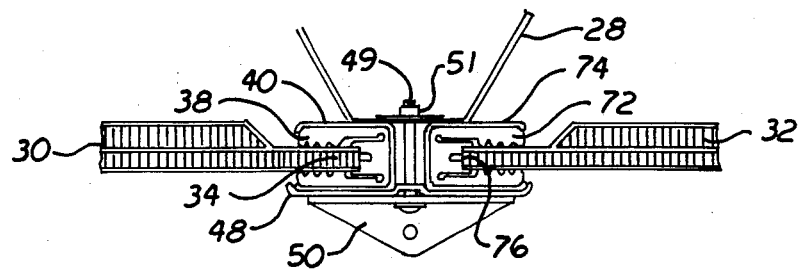
FIG. 7 is a front elevation view in section of the first end of each panel joined together.
Figure 8:
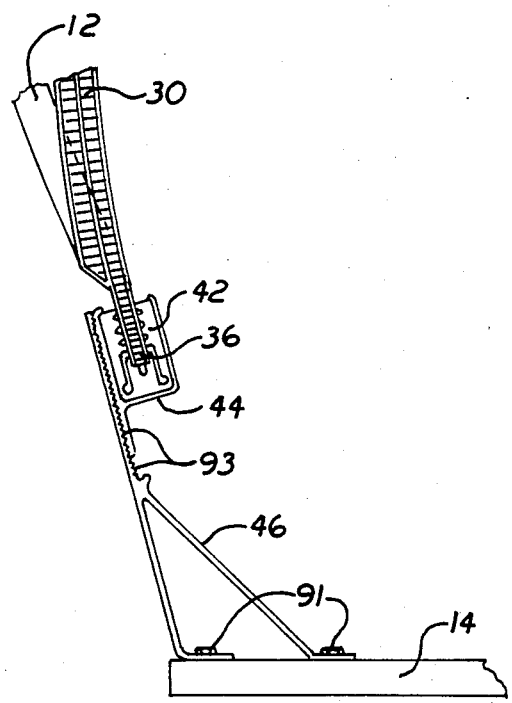
FIG. 8 is a front elevation view in section of the second end of the starboard module panel mounted within the starboard isolators.
Figure 9:
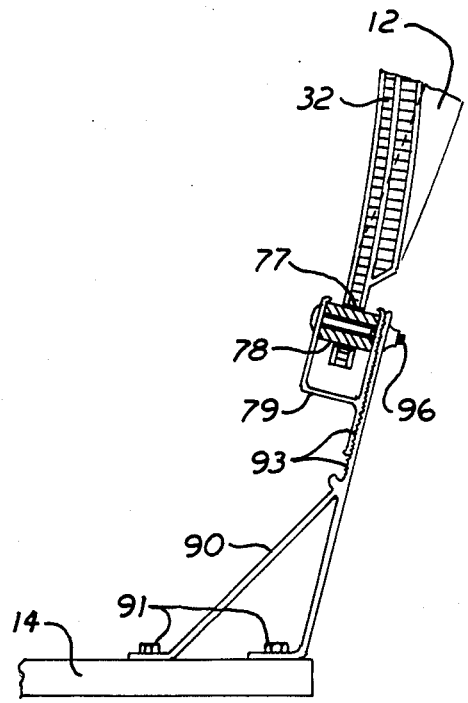
FIG. 9 is a front elevation view in section of the second end of the port module panel showing a through bolt mount.
Figure 10:
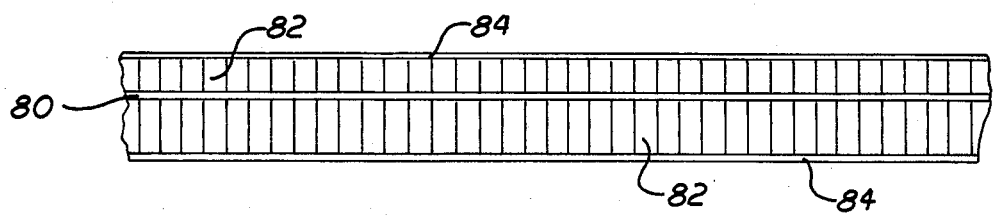
FIG. 10 is a cross-section view of the panel layers.

With reference to FIGS. 1 and 2, the module 10 is shown spaced apart from the aircraft skin 12. The aircraft has a deck panel 14 and under the deck panel is a storage area 16. The passenger space 18 contains seats 20, starboard luggage box 22 and port luggage box 24 and in FIG. 2, overhead luggage box 26. The module support beam 28 is located in the overhead area of the aircraft.

The module 10 is made up of a starboard panel 30 and a port panel 32. The starboard panel 30 has a first end 34 and a second end 36. See FIG. 3.

The first end 34 of starboard module panel 30 is mounted in multiple elastomeric starboard overhead isolators 38 which are frictionally inserted within channel 40. In like manner, the second end 36 of module panel 30 is mounted in starboard deck isolators 42 which are mounted in a starboard deck channel 44.

The overhead channel 40 is held in place by mounting bracket 50 and longitudinal close-out member 48. Bolt 49 and nut 51 hold the overhead assembly of 38, 40, 48, 50, 72 and 74 to support beam 28.

Channel 44 is held in place by starboard support brackets 46 mounted to the aircraft floorbeam 14. A trim panel 45 can be applied to the side of channel 44 facing the inside of the aircraft.

Each module panel is attached to its adjacent module panel by an overhead module joiner 52 and a starboard or port module joiner 54. An overlap clip 56 on the overhead joiner 52 and overlap clip 58 on the starboard joiner 54 are hooked to the window openings in the module. Overhead joiner 52 and joiner 54 retain foam seal 60 in place.

Seat track 86 supports structural deck panels 14. Acoustical deck panels 88 cover the deck panels 14. Groove 92 in the seat track 86 receives the seat 20 vertical support member 94. See FIGS. 1 and 4.

Accessory equipment such as overhead bin 22 is attached to a support fitting 62 which is fastened to honeycomb panel 30. Overhead bins such as 26 are supported by struts 64 attached to mounting bracket 50. A frameliner 66 encloses the overhead space 68 of the module. This overhead space 68 contains the additional auxiliary equipment such as air vents 70.

In like manner, the first end 76 of port module panel 32 is mounted in the overhead area of the aircraft in elastomeric isolators 72 contained within channel 74. The second end 77 is mounted in isolators 78 contained within channel 79. A through bolt 96 prevents forward movement of channel 44 or 79.

Each panel 30 or 32 contains a damping sheet of vinyl 80 separating honeycomb cores 82 on each side. Exterior to each honeycomb core 82 is a structural face 84. The panel is lightweight and suppresses transmission of sound while still maintaining structural integrity.

Each isolator consists of a cartilage of vibration absorbing material which is usually an elastomer but can be substituted with other resilient vibration absorbing materials. Each isolator is frictionally attached to the interior of a channel. Each support bracket 46 or 90 is provided with serrated edges 93 to adjust their position. Adjustment is made by loosening through bolt 96 so that the channel 44 or 79 can be moved up or down with respect to the bracket 46 or 90 respectively. The number of support brackets 46 or 90 is optional and is determined entirely by the structural requirements of the aircraft. Bolt assembly 91 attaches the bracket 46 or 90 to the aircraft deck 14. The configuration described rigidly supports the panels within the aircraft and is spaced apart from the fuselage skin so that a cocoon structure is created which can support all interior accessory equipment such as bins 22, 24 and 26 without sacrificing any acoustical dampening effect. The arcuate structure of the panels add additional support for these accessory items.

Minor modifications and equivalent elements can be substituted in the acoustical module without departing from the invention as described herein.

Having thus described the invention what is claimed as new and desired to be secured by Letters Patent is:

1. A module for the interior of an aircraft fuselage containing a fuselage deck, the module comprising:
    (a) contiguous pairs of arcuate port and starboard panels having a first and a second end;
    (b) the first end of each panel mounted in multiple isolaters located within separate overhead support channels;
    (c) multiple support brackets attached to a port and starboard side of the fuselage deck;
    (d) an adjustable port support channel attached to the support brackets on the port side of the fuselage deck;
    (e) an adjustable starboard support channel attached to the support brackets on the starboard side of the fuselage deck;
    (f) multiple isolators mounted in the port and starboard channels for receiving and holding the second end of each arcuate panel; and
    (g) the overhead support channels supported by an assembly attached to an overhead portion of the fuselage, the arcuate panels thereby being spaced apart from the fuselage of the aircraft.

2. A module according to claim 1 wherein the isolators comprise an elastomeric cartilage of vibration absorbing material.

3. A module according to claim 1 wherein the fuselage deck is covered by multiple panels of a honeycombed material.

4. A module according to claim 1 wherein the panels contain a layer of damping material between layers of honeycomb material.

5. A module according to claim 1 wherein auxiliary port and starboard bins are fastened to the respective port and starboard panels.

6. A module according to claim 1 wherein each pair of arcuate port and starboard panels is fastened to an adjacent pair of port and starboard panels with a joining member.

7. A cocoon structure for acoustical protection of passengers within the interior of an aircraft fuselage containing a fuselage deck comprising:
    (a) a multiplicity of panels held together in abutting end to end relationship by one or more joiner arches;
    (b) each panel having a port and starboard component with each component having first and second ends inserted into multiple isolators;
    (c) each isolator engaged within a channel member attached to a mounting element structurally affixed to an interior fuselage surface of the aircraft; and
    (d) one or more acoustical panels covering the fuselage deck, the cocoon structure thereby being spaced apart from the fuselage of the aircraft.

8. A cocoon structure according to claim 7 wherein the isolators comprise an elastomeric cartilege of vibration absorbing material.

9. A cocoon structure according to claim 7 wherein each port and starboard panel contains a central damping layer between layers of honeycomb material and outer layers of a structurally supportive material.

10. A cocoon structure according to claim 9 wherein the damping layer is a vinyl sheet.

11. A cocoon structure according to claim 7 wherein a trim panel is affixed to the interior surface of each arcuate panel.

12. A cocoon structure according to claim 7 wherein the acoustical panel covering the deck is a layer of honeycomb material having outer layers of a structurally supportive material.

13. A method of mounting an aircraft interior module within an aircraft fuselage containing a fuselage deck comprising:

(a) mounting support beams from an overhead interior surface of the fuselage;

(b) attaching a mounting plate containing a port and starboard overhead channel member to the support beams by multiple overhead brackets;

(c) attaching a port and starboard deck channel member to a multiplicity of port and starboard mounting brackets respectively affixed to the fuselage deck;

(d) mounting multiple isolator members in each channel member;

(e) mounting a first end of an arcuate starboard acoustical panel in the isolators in the starboard overhead channel member and a second end in the isolators in the starboard deck channel member;

(f) mounting a first end of an arcuate port acoustical panel in the isolators in the port overhead channel member and a second end in the isolators in the port deck channel member;

(g) mounting flat deck acoustical panels over the fuselage deck to form a module spaced apart from the aircraft fuselage.

14. The method according to claim 13 wherein multiple adjacent panels are joined together side to side by one or more joiner members to form a module within substantially the entire interior space of the aircraft fuselage.

15. The method according to claim 13 wherein the acoustical panels contain a central damping layer between layers of honeycomb material and outer layers of a structurally supportive material.

16. The method according to claim 13 wherein the port and starboard deck channel members are moved with respect to the port and starboard mounting brackets respectively by loosening a through bolt connecting the channel and brackets.

* * * * *